United States Patent [19]

Hambrick

[11] 3,772,830

[45] Nov. 20, 1973

[54] RAIL CROPPING SAW

[75] Inventor: Lester N. Hambrick, Irving, Tex.

[73] Assignee: Trakwork Equipment Company, Irving, Tex.

[22] Filed: Aug. 9, 1971

[21] Appl. No.: 169,987

[52] U.S. Cl. .................................................. 51/178
[51] Int. Cl. ............................................ B24b 23/00
[58] Field of Search ...................................... 51/178

[56] References Cited
UNITED STATES PATENTS

| | | | |
|---|---|---|---|
| 3,046,707 | 7/1962 | Obear | 51/178 |
| 3,254,455 | 6/1966 | Hensley | 51/178 |
| 2,257,480 | 9/1941 | Perazzoli | 51/178 |
| 2,214,141 | 9/1940 | Mall | 51/178 |

*Primary Examiner*—James L. Jones, Jr.
*Attorney*—Richards, Harris and Hubbard

[57] ABSTRACT

In a rail cropping saw, a vehicle supports a pair of rail clamping members and a saw blade. The vehicle is adapted for movement along a trackway to the location of a bolted joint between two rails of the trackway. The rail clamping members are supported on a frame which is attached to the side of the vehicle opposite the bolted joint, and function to grip the rails on opposite sides of the bolted joint. The saw blade is rotated about an axis extending parallel to the rails and is simultaneously oscillated in a direction extending perpendicular to the rails to sever the bolted joint from one of the rails.

11 Claims, 4 Drawing Figures

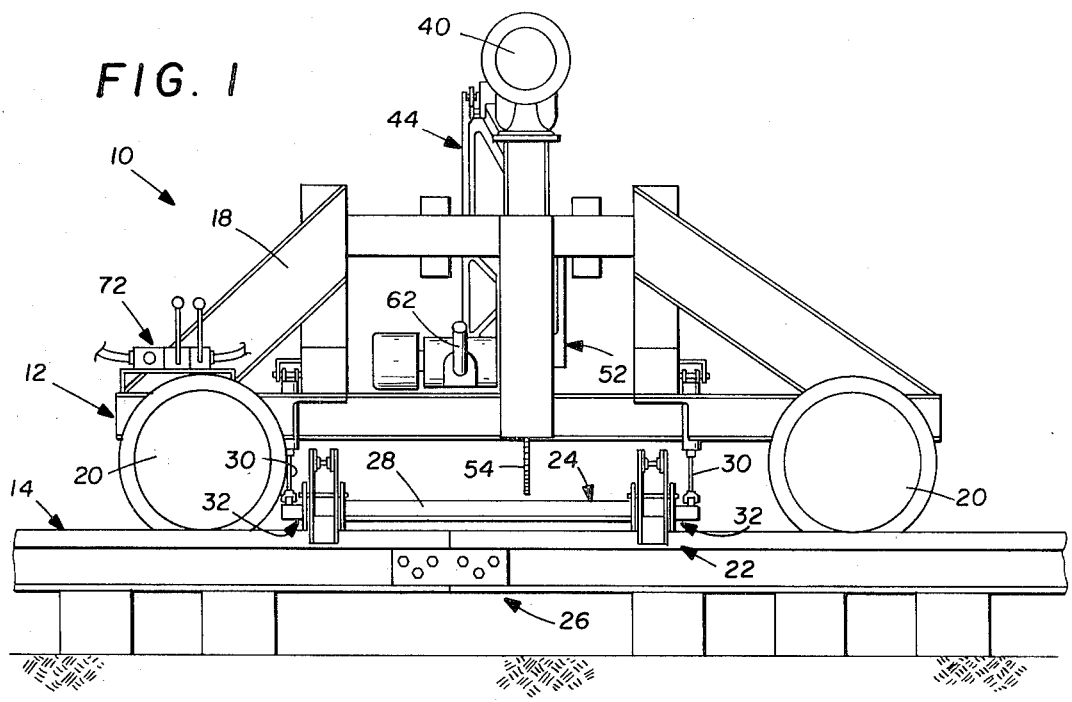
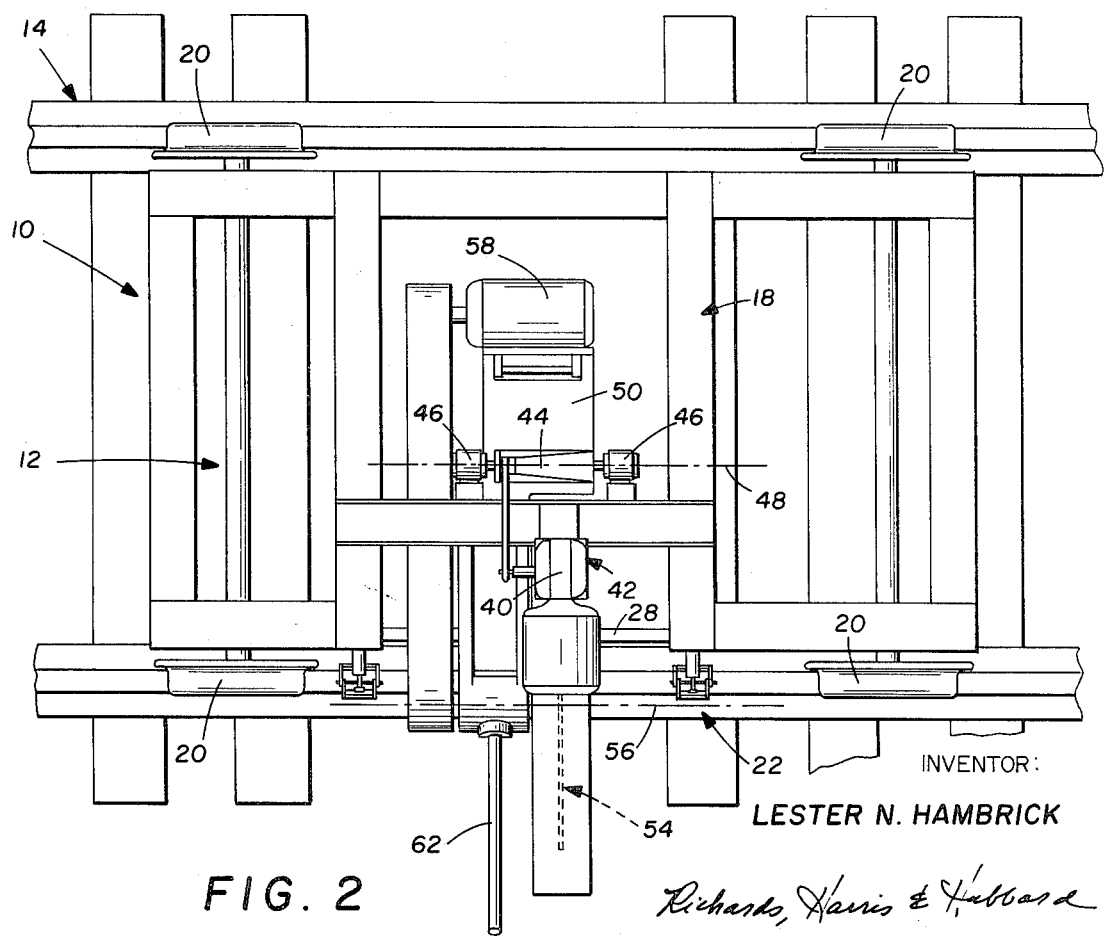

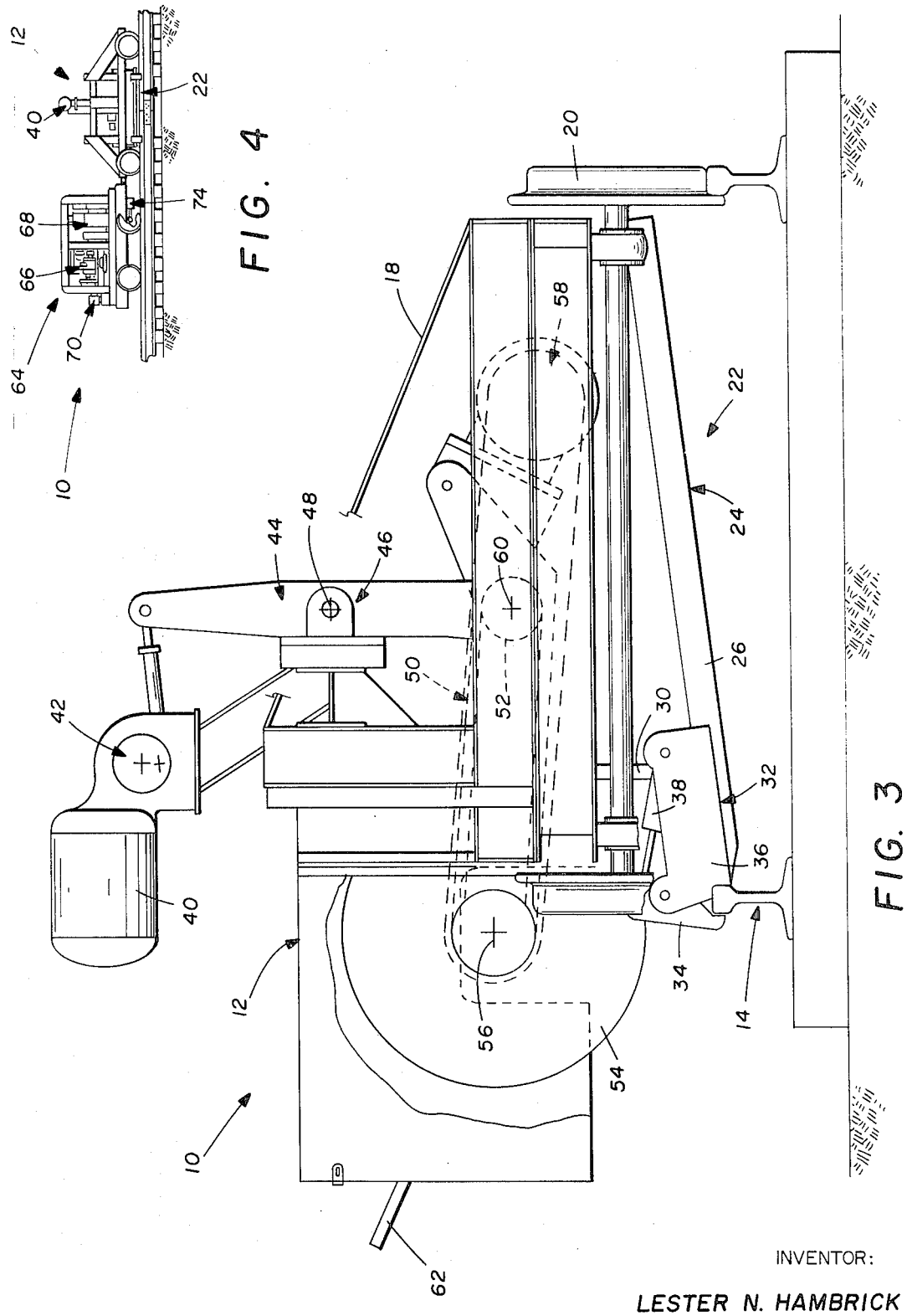

RAIL CROPPING SAW

BACKGROUND AND SUMMARY OF THE INVENTION

This invention relates to a rail cropping saw, and more particularly to a saw for severing bolted joints from rails.

The co-pending application of John F. Bryan, Jr., filed July 16, 1970, Ser. No. 55,470 now U.S. Pat. No. 3,726,232, relates to a Track Welding System for interconnecting rails in railroad tracks and similar trackways. In the practice of the Bryan invention, existing bolted joints between the rails of a trackway are removed. Thereafter, welded joints are formed between the adjacent ends of the rails by oxyacetylene welding.

The present invention comprises a novel rail cropping saw useful in the practice of the Bryan invention to remove bolted joints from between the rails of a trackway. In accordance with the preferred embodiment of the invention, a vehicle is adapted for movement along a trackway and supports a rail clamping mechanism and a saw blade. The clamping mechanism functions to align the saw blade by gripping adjacent rails in the trackway on opposite sides of a bolted joint therebetween. The saw blade is then simultaneously rotated about an axis extending parallel to the rails and oscillated in a direction extending perpendicular to the rails to sever the bolted joint from one of the rails.

DESCRIPTION OF THE DRAWINGS

A more complete understanding of the invention may be had by referring to the following Detailed Description when taken in conjunction with the accompanying Drawings, wherein:

FIG. 1 is a side view of a rail cropping saw incorporating the invention;

FIG. 2 is a top view of the rail cropping saw shown in FIG. 1;

FIG. 3 is an enlarged end view of the rail cropping saw; and

FIG. 4 is a schematical illustration of the use of the rail cropping saw shown in FIG. 1.

DETAILED DESCRIPTION

Referring now to the Drawings, and particularly to FIG. 1 thereof, there is shown a rail cropping saw 10 incorporating the present invention. The rail cropping saw 10 comprises a vehicle 12 adapted for movement along a trackway 14 to the location of a bolted joint 16 formed between two of the rails of the trackway 14.

The vehicle 12 of the rail cropping saw 10 includes a frame 18 and four flanged wheels 20 which support the frame 18 for movement along the trackway 14. As is best shown in FIGS. 1 and 3, a rail clamping mechanism 22 is supported on the vehicle 12 for gripping interengagement with the rails of the trackway 14 on opposite sides of the bolted joint 16. The clamping mechanism 22 includes a frame 24 which comprises a pair of beams 26 that are connected to the opposite side of the frame 18 of the vehicle 12 from the bolted joint 16. A member 28 joins the ends of the beams 26 adjacent the bolted joint 16, so that the frame 24 of the rail clamping mechanism 22 forms a parallelogram with the frame 18 of the vehicle 12.

The rail clamping mechanism 22 further includes a pair of hydraulic cylinders 30 for selective operation to manipulate the frame 24 between an elevated transportation position and the operating position illustrated in FIGS. 1 and 3. A pair of clamping members 32 are supported on the frame 24 of the clamping mechanism 22 for engagement with the rails of the trackway 14. Each clamping member 32 comprises a pair of opposed jaws 34 and 36 and a hydraulic cylinder 38 adapted to close the opposed jaws on a rail.

Referring now particularly to FIG. 3, an electric motor 40 is supported on the frame 18 of the vehicle 12. The motor 40 drives an eccentric 42 which is connected to the upper end of a vertically extending beam 44. The mid-portion of beam 44 is supported on the frame 18 by a pair of pillow blocks 46. Thus, the motor 40 functions to rock the beam 44 back and forth about a horizontally extending axis 48.

The mid-portion of a horizontally extending beam 50 is supported on the lower end of the vertically extending beam 44 by a pair of bearings 52. A saw blade 54 is mounted on one end of the horizontally extending beam 50 for rotation about a horizontally extending axis 56 under the action of an electric motor 58. The electric motor 58 is mounted at the opposite end of the horizontally extending beam 50 from the saw blade 54, and serves to counterbalance the saw blade 54 relative to a horizontally extending axis 60. A handle 62 is provided for pivoting the horizontally extending beam 50 about the axis 60 and thereby engaging the saw blade 54 with a rail of the trackway 14.

Those skilled in the art will realize that the component parts of the rail cropping saw 10 identified by reference numerals 40–74 comprise a prior art sawing structure. For example, a sawing structure suitable for use in the rail cropping saw 10 is presently commercially available from the Allison-Campbell Company and is identified by that company as a No. 3–A Sever-All Abrasive Cutting Machine. Similarly, the saw blade 54 preferably comprises one of the saw blade structures that is commonly employed to cut hard, tough materials such as the steel that is used to make railroad rails. For example, the saw blade of the rail cropping saw 10 may comprise diamond dust imbedded in a copper disk.

Referring now to FIG. 4, the rail cropping saw 10 further includes a vehicle 64 which is coupled to the vehicle 12 for movement along the trackway 14. The vehicle 64 supports an engine 66 which drives an electric generator 68 and a hydraulic pump 70. As will be apparent, the output of the generator 68 is connected to the motors 40 and 58 through suitable switches (not shown). Similarly, the output of the hydraulic pump 70 is connected to the hydraulic cylinders 30 and 38 through a valve assembly 72 mounted on the vehicle 12. The output of the pump 70 is also connected to a hydraulic motor 74, which is selectively operable to propel the rail cropping saw 10 along the trackway 14.

OPERATION

In the use of the rail cropping saw 10, the engine 66 is initially started, after which the hydraulic cylinders 38 and 30 are operated to open the jaws 34 and 36 of the clamping members 32 and to raise the frame 24 of the clamping mechanism 22. Thereafter, the hydraulic motor 74 is operated to propel the vehicles 12 and 64 of the rail cropping saw 10 along a trackway to the location of a bolted joint between two rails in the trackway.

When the rail cropping saw 10 is properly positioned, the hydraulic cylinders 30 are actuated to lower the frame 24 until the clamping members 32 engage the rail. Then, the hydraulic cylinders 38 are actuated to close the jaws 34 and 36 of the clamping members 32. Since the frame 24 of the clamping mechanism 22 forms a parallelogram with the frame 18 of the vehicle 12, this action serves to align the axes 48, 56 and 60 of the rail cropping saw 10 with the rails of the trackway.

As soon as the rails of the trackway that are connected by the bolted joint are engaged by the clamping mechanism 22, the motors 40 and 58 are energized to simultaneously rotate and oscillate the saw blade 54 relative to the rails of the trackway. The handle 62 is then manipulated to engage the saw blade 54 with one of the rails, whereby the rail is severed from the bolted joint. As has been indicated, the use of the clamping mechanism 22 assures alignment of the axes 48, 56, and 60 with the rails of a trackway. By this means, the motors 40 and 58 function to simultaneously rotate the blade 54 about an axis extending parallel to the rails and to oscillate the saw blade 54 in a direction extending perpendicular to the rails, whereby a clean cut which extends perpendicular to the rails is assured.

As soon as one of the rails of the trackway has been severed from the bolted joint, the cylinders 38 and 30 are actuated to open the jaws 34 and 36 and to raise the frame 24, respectively. Then, the motor 74 is operated to position the saw blade on the opposite side of the bolted joint. Thereafter, the foregoing steps are repeated to sever the other rail of the trackway from the bolted joint.

From the foregoing, it will be understood that the present invention comprises a rail cropping saw including a vehicle adapted for movement along a trackway to the location of the bolted joint between two rails of the trackway, a sawing structure for severing the bolted joint from the rails and a rail clamping mechanism for aligning the sawing structure with the rails. The clamping mechanism preferably comprises a parallelogram frame supported on the opposite side of the vehicle from the bolted joint and a pair of clamping members for engagement with the rails on opposite sides of the bolted joint. The sawing structure preferably comprises a saw blade and apparatus for rotating the saw blade and for simultaneously oscillating the saw blade in a direction extending perpendicular to the rail.

Although the preferred embodiment of the invention has been illustrated in the Drawings and described in the foregoing specification, it will be understood that the invention is not limited to the embodiment disclosed, but is capable of rearrangement, modification and substitution of parts and elements without departing from the spirit of the invention.

What is claimed is:

1. A rail cropping saw comprising:
    a vehicle for movement along a trackway;
    clamping means mounted on the vehicle for gripping a rail on one side of the trackway and comprising a frame including a pair of beams pivotally connected to the vehicle at spaced points on one side thereof and extending transversely across the vehicle, and a member extending between the distal ends of the beams parallel to the rails of the trackway;
    a pair of clamping members mounted on the frame for gripping the rail of the trackway on the opposite side thereof from the point of connection of the frame to the vehicle;
    a saw blade supported on the vehicle for engagement with a rail gripped by the clamping means; and
    means mounted on the vehicle for simultaneously rotating the saw blade about an axis extending parallel to the rail and oscillating the saw blade in a direction extending perpendicular to the rail.

2. A rail cropping saw comprising:
    a vehicle for movement along a trackway;
    clamping means mounted on the vehicle for gripping a rail on one side of the trackway;
    a saw blade supported on the vehicle for engagement with a rail gripped by the clamping means;
    means mounted on the vehicle for simultaneously rotating the saw blade about an axis extending parallel to the rail and oscillating the saw blade in a direction extending perpendicular to the rail;
    said saw rotating and oscillating means comprising:
    a vertically extending beam;
    means mounted on the vehicle for supporting the vertically extending beam for oscillation about a first horizontal axis extending through the mid-portion of the vertically extending beam;
    means mounted on the vehicle and connected to the upper end of the vertically extending beam for oscillating the vertically extending beam about the first axis;
    a horizontally extending beam;
    means for pivotally connecting the mid-portion of the horizontally extending beam to the lower end of the vertically extending beam;
    means on the horizontally extending beam for supporting the saw blade for rotation about a second horizontal axis; and
    means mounted on the horizontally extending beam for rotating the saw blade about the second axis.

3. The rail cropping saw according to claim 2, wherein the saw blade rotating means is mounted on the opposite end of the horizontally extending beam from the saw blade and serves to counterbalance the saw blade.

4. A rail cropping saw comprising:
    a vehicle for movement along a trackway to the location of a bolted joint between two rails of the trackway;
    a frame including a pair of beams pivotally connected to the vehicle at spaced points on the opposite side of the trackway from the bolted joint and extending across the vehicle, and a member extending between the ends of the beams adjacent the bolted joint;
    a pair of clamping members mounted on the frame for gripping the two rails of the trackway at points on opposite sides of the bolted joint; and
    saw means mounted on the vehicle for engagement with one of the rails to sever the bolted joint therefrom.

5. The rail cropping saw according to claim 4 wherein the clamping members comprise opposed jaws and further including means for actuating the opposed jaws to grip a rail therebetween.

6. The rail cropping saw according to claim 5 further characterized by an engine, a hydraulic pump driven by the engine, a hydraulic motor for actuation by the hydraulic pump to propel the vehicle along the trackway, first hydraulic cylinders for actuation by the hydraulic pump to operate the jaws of the clamping members, and second hydraulic cylinders for operation by the hydraulic pump to raise and lower the frame relative to the vehicle.

7. The rail cropping saw according to claim 6 wherein the saw means is further characterized by a saw blade, means for rotating the saw blade about a horizontal axis, and means for oscillating the rotating saw blade in a vertical plane.

8. A rail cropping saw comprising:
   a vehicle for movement along a trackway to the location of a bolted joint between two rails of the trackway;
   a frame including a pair of beams pivotally connected to the side of the vehicle opposite the bolted joint and extending transversely across the vehicle, and a member connected between the distal ends of the beams;
   a pair of rail clamping members mounted on the frame for gripping engagement with the two rails on opposite sides of the bolted joint;
   a saw blade mounted on the vehicle for engagement with one of the rails at a point between one of the clamping members and the bolted joint; and
   means for rotating the saw blade about an axis extending parallel to the rails and for simultaneously oscillating the saw blade back and forth along a line extending perpendicular to the rail. rail 9. The rail cropping saw according to claim 8 further characterized by means connected between the vehicle and the frame for raising and lowering the frame and thereby alternately positioning the clamping members in an elevated transportation position and in a rail gripping position.

10. The rail cropping saw according to claim 9 wherein each clamping member comprises a pair of opposed jaws and means for moving at least one of the jaws between a rail releasing position and a rial clamping position.

11. The rail clamping saw according to claim 10 wherein the saw blade rotating and oscillating means includes:
   a horizontally extending beam;
   means for supporting the saw blade on one end of the horizontally extending beam for rotation about a horizontally extending axis;
   means mounted on the opposite end of the horizontally extending beam for rotating the saw blade of the horizontally extending axis;
   a vertically extending beam;
   means pivotally connecting the mid-portion of the vertically extending beam to the vehicle; and
   means connected to the upper end of the vertically extending beam for rocking the vertically extending beam about its point of connection to the vehicle and thereby oscillating the saw blade.

* * * * *